United States Patent [19]

Gregerson

[11] Patent Number: 4,838,422

[45] Date of Patent: Jun. 13, 1989

[54] DATA STORAGE CONTAINER

[75] Inventor: Barry Gregerson, Shorewood, Minn.

[73] Assignee: Empak, Inc., Chanhassen, Minn.

[21] Appl. No.: 124,285

[22] Filed: Nov. 23, 1987

[51] Int. Cl.⁴ .............................................. B65D 85/30
[52] U.S. Cl. .................................. 206/444; 206/387; 206/449; 206/555; 206/503; 312/12
[58] Field of Search ............... 206/387, 444, 449, 454, 206/455, 555, 503; 312/9, 10, 12; 220/23.4

[56] References Cited

U.S. PATENT DOCUMENTS

| | | | |
|---|---|---|---|
| 3,424,334 | 1/1969 | Goltz | 220/23.4 |
| 3,506,321 | 4/1970 | Hampel | 220/23.4 |
| 4,248,344 | 2/1981 | Yoshida | 220/23.4 |
| 4,428,480 | 1/1984 | Ackeret | 206/387 |
| 4,493,417 | 1/1985 | Ackeret | 206/387 |
| 4,519,655 | 5/1985 | Kamperman | 312/12 |
| 4,702,372 | 10/1987 | Ackeret | 206/387 |
| 4,702,533 | 10/1987 | Seifert | 312/12 |

Primary Examiner—David T. Fidei
Attorney, Agent, or Firm—Hugh D. Jaeger

[57] ABSTRACT

An open-ended data storage container for the storage of a disk cartridge, such as an optical disk or magnetic disk with data stored thereon. Two engaging members form an enclosure with a spring like retainer member for containment or ejection of a disk cartridge from the data storage container. Mating rails on the top and bottom surfaces of the data storage container allow for engaged stacking of like data storage containers horizontally or vertically.

5 Claims, 8 Drawing Sheets

DATA STORAGE CONTAINER

BACKGROUND OF THE INVENTION

1. Field of the Invention

The present invention pertains to a package for storage of optical or magnetic disk cartridges, and more particularly, pertains to a modular stackable data storage container with mating engagement rails and a spring-biased containment device.

2. Description of the Prior Art

Advances in magnetic disk technology have led to a 3½" diameter flexible magnetic disk contained within a rigid cassette. Such disks perform the same electronic data storage functions as the well known 5¼" diameter flexible magnetic disks commonly used with personal computers. The 5¼" diameter disks, known as diskettes, were enclosed in a plastic sheath or envelope having windows which allowed a magnetic transducer to engage the disk when inserted in a drive. When not in use, the 5¼" diskettes were stored in paper pocket envelopes and stored in drawers, in file type storage boxes, and other like devices, to protect them from dust, liquids and other contaminants while still having them readily available to the user.

The smaller size and rigid construction of the 3½" diskettes made the prior art 5¼" diskette storage devices, even with proportionally reduced dimensions, an unsatisfactory solution. The smaller diskettes are difficult to withdraw from a bin because of their rigidity. The lack of flexibility prevents an operator from deflecting the diskettes to the rear of the desired one in order to grasp the edge and lift it from the bin. The same is true for 5¼" file type storage devices.

The data storage container device of the present invention is a radical departure from the prior art. Instead of storing multiple diskettes in a file or bin, individual packages are provided. One end of the container is open to provide quick and easy access. To prevent the diskette from accidentally falling out of the data storage container, a spring retainer is provided. The same retainer serves to eject the diskette from the data storage container. The present invention also has utility in the storage of optical disk cartridges or other data like disk structures.

The data storage container of the present invention is also an assembly of top and bottom portions which are held together by mechanical structure, obviating the need for plastic welding, stacking or adhesive bonding techniques.

SUMMARY OF THE INVENTION

The general purpose of the present invention is a data storage container. Data storage container is a generic term also meaning a package or special receptacle for disk cartridges having data stored thereon.

According to one embodiment of the present invention, there is provided an open-ended data storage container which includes a bottom member having a planar member between three vertical side members, an access cutout on one end of the planar portion and parallel protruding rails on the outer surface of the planar member. A spring-like cassette retainer and ejector member, located near a vertical side on the upper surface of the planar member, retains or ejects a disk. A top member includes a planar member with parallel recessed rails on the outer surface and an access cutout on one edge. Two sides, each with a right angle lip member, extend downwardly from the package top planar member to overlap and lock with the side members of the package bottom.

The term container or cartridge as used herein refers to the rigid assembly which immediately surrounds a flexible or nonflexible magnetic disk or optical disk. Such cartridge assemblies generally have some form of central hole or bearing assembly which allows a disk drive spindle to engage the disk. In addition, a slot in the assembly is included to allow access to the disk for a transducer. The slot is often covered with a sliding cover which retracts and opens the slot when the disk in the disk cartridge is placed in a drive.

One significant aspect and feature of the present invention is a data storage container assembled from top and bottom members which snap together to form a integral data storage container assembly.

Another significant aspect and feature of the present invention is a data storage container having a one-piece cartridge retainer/ejector member which serves to retain the disk cartridge within the container and, when actuated, serves to eject the disk cartridge from the data storage container.

A further significant aspect and feature of the present invention is a stackable data storage container.

Having thus described embodiments of the present invention, it is the principal object hereof to provide a data storage container for the storage of magnetic disk or other cassettes or cartridges.

Another object of the present invention is to provide an easily assembled data storage container for storage, including a retention and ejection member.

A further object of the present invention is to provide an easily assembled data storage container having a positive retention structure with a minimum of moving parts.

Yet another object of the present invention is to provide a stackable and modular data storage container storage device.

DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
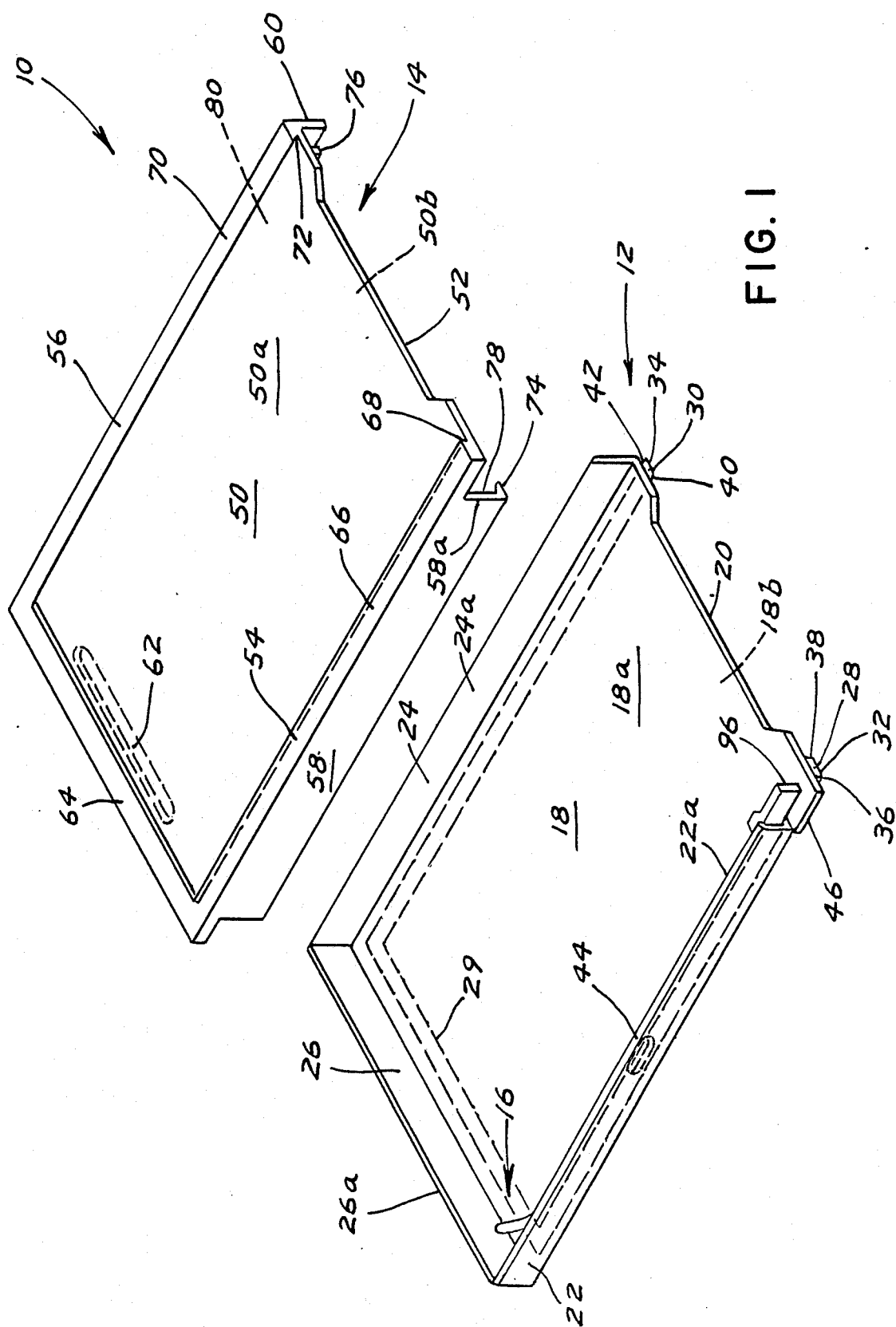
FIG. 1 illustrates a perspective view of the component parts of a data storage container, the present invention.

FIG. 1 illustrates a perspective view of component parts of a data storage container 10, the present invention, for the storage of magnetic or optical disk cartridges or the like. The data storage container includes a package bottom member 12, a package top member 14 and a disk retainer/ejector member 16. The package top member 14 fits over the package bottom member 12 to form an open ended rectangular box like data storage container. The package bottom member 12 includes a planar member 18 with an access cutout 20 on one edge, opposing and parallel side walls 22 and 24, and an end wall 26, each of which are perpendicular to the planar surface 18. Walls 22, 24, and 26 include beveled edges 22a, 24a and 26a to facilitate sliding accommodation of the package top member 14 over the package bottom member 12.

Tapered parallel protruding rails 28 and 30 lie opposite each other on the bottom surface 18b. Tapered parallel rail 28 includes bottom surfaces 32, and angled sides 36 and 38 adjacent to bottom surface 32. Rail 30 includes similar angled sides 40 and 42 adjacent to the bottom surface 34. A support member 29 on lower surface 18b and adjacent to the end wall 26 connects the ends of the tapered parallel rails 28 and 30. The tapered parallel protruding rails 28 and 30 act as data storage container feet, but more importantly, are designed to mate with the top portion of another like package for vertically or horizontally oriented modular package stacking. The taper of tapered parallel rails 28 and 30 decreases toward end wall 26.

The package top member 14 includes a planar member 50, an access cutout 52 in one end, and rail members 54 and 56 positioned on the upper surface 50a of planar member 50. Parallel sides 58 and 60 are perpendicular to the planar member 50. A stop bar 62, adjacent to an end 64 on the lower surface 50b of the planar member 50, serves to stop the disk cartridge when inserted into the package. Rail member 54 includes a top surface 66 and an adjacent angled surface 68. Rail member 56 includes a top surface 70 and an adjacent angled surface 72. Side 58 includes a lip 74 extending the length of side 58. Side 60 includes a lip 76 extending the length of side 60. A flexible channel member 78 is formed by side 58, lip 74 and the lower surface 50b of the planar member 50. An opposing and like flexible channel member 80 is formed by side 60, lip 76 and the lower surface 50b of the planar member 50.

A spring-like retainer/ejector member 16, as later described in detail, positions over an elongated post 44 to retain a disk cartridge within the interior of the data storage container 10. A tab 46, an extension of the planar member 18, locates adjacent to the end of the side wall 22 near the access cutout 20 for engagement against a member of the package top member 14 to lock the package top member 14, which is normally slid over the package bottom member 12 to the package bottom member 14.

Flexible channel members 78 and 80 of the package top member 14 slip over the side walls 22 and 24 of the package bottom member 12 either by sliding or by hooking one of the lips 74 or 76 over side wall 22 or 24, respectively, then pushing the remaining unengaged members together for a snap fit and sliding bottom member 12 until the wall 26 hits stop bar 62. When the package top member 14 is locked against package bottom member 12, a tab 46 engages a vertical end 58a of package top member 14 to prevent the package top member 14 from disengagement. The package top may be readily disengaged from the package bottom merely by applying outward pressure to the end of a side 58 in the vicinity of the vertical end 58a, and then sliding the package bottom and top members 12 and 14 in opposite directions.

Figure 2:
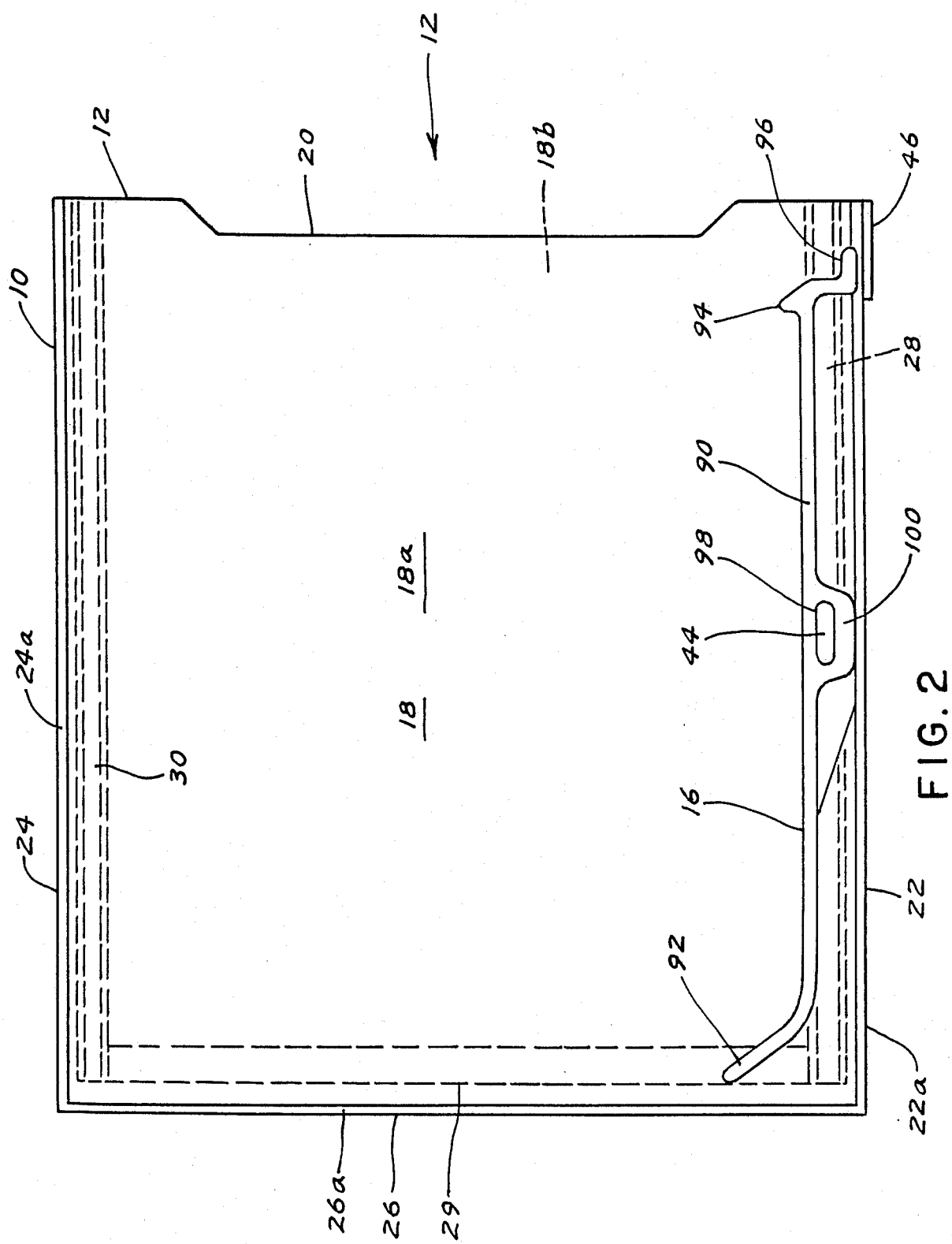
FIG. 2 illustrates a top view of the data storage container bottom.

FIG. 2 illustrates a top view of the package bottom member 12 where all numerals correspond to those elements previously described. Shown in particular is the placement of the spring like retainer/ejector member 16 engaged over the elongated post 44. The retainer/ejector member 16 includes an essentially rectangular cross section body member 90, one angular end member 92, and a catch 94 and catch release member 96 on the opposing end. An elongated hole 98, in the reinforced body 100, provides for mounting over the elongated post 44 within the interior of the data storage container 10.

Figure 3:
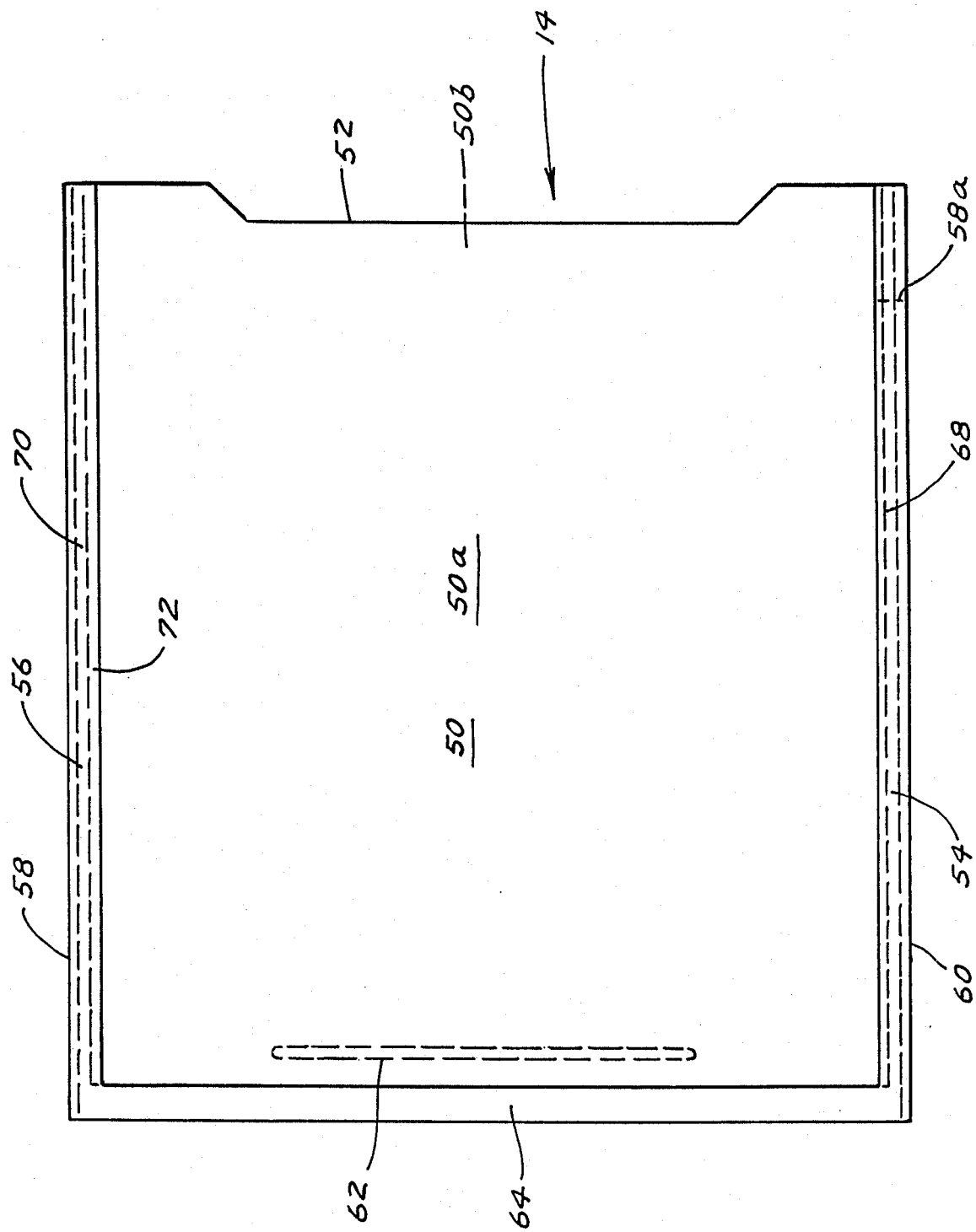
FIG. 3 illustrates a top view of the data storage container top.

FIG. 3 illustrates a top view of the package top member 14 where all numerals correspond to those elements previously described.

Figure 4:
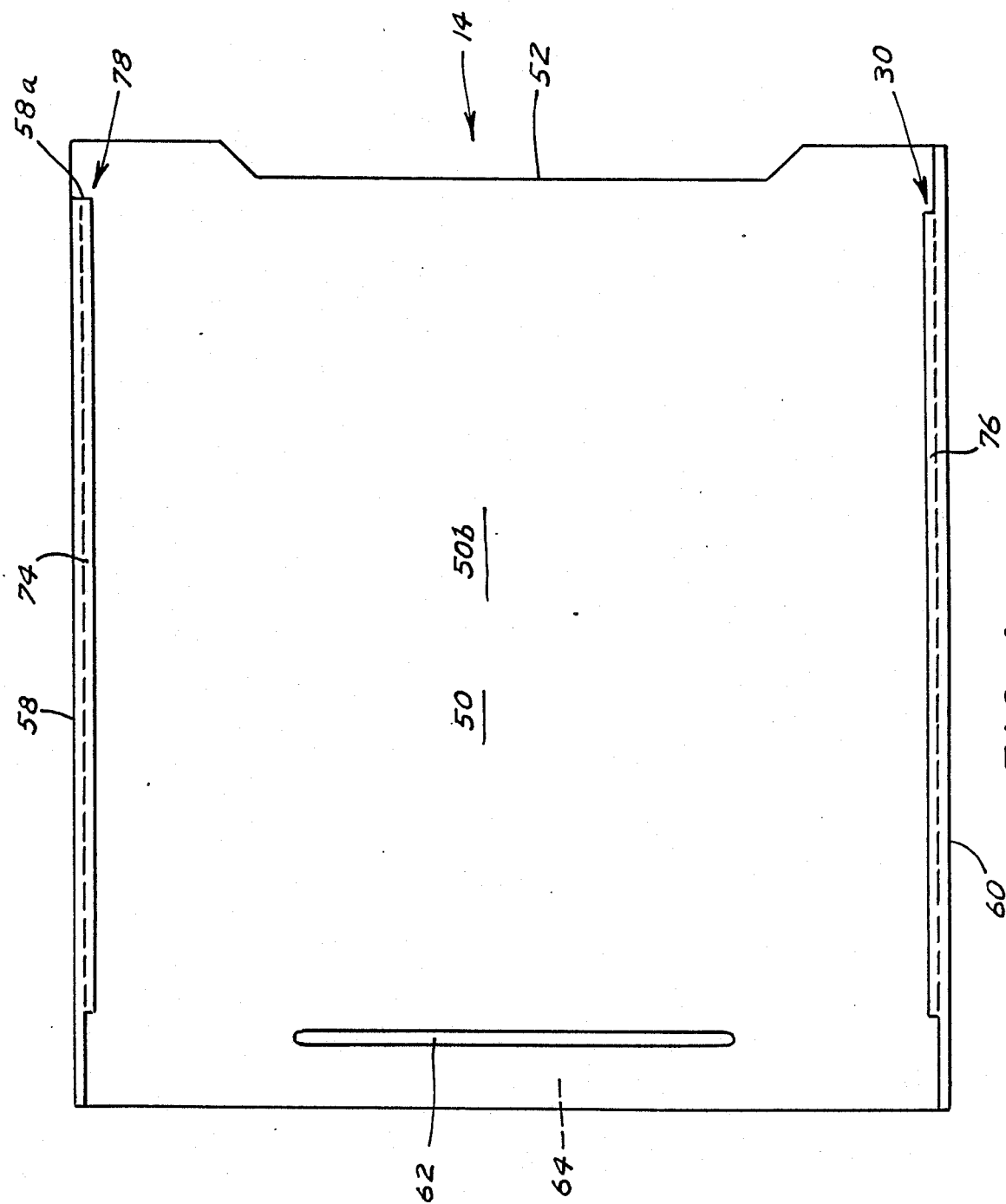
FIG. 4 illustrates a bottom view of the data storage container top.

FIG. 4 illustrates a bottom view of the package top member 14 where all numerals correspond to those elements previously described.

Figure 5:
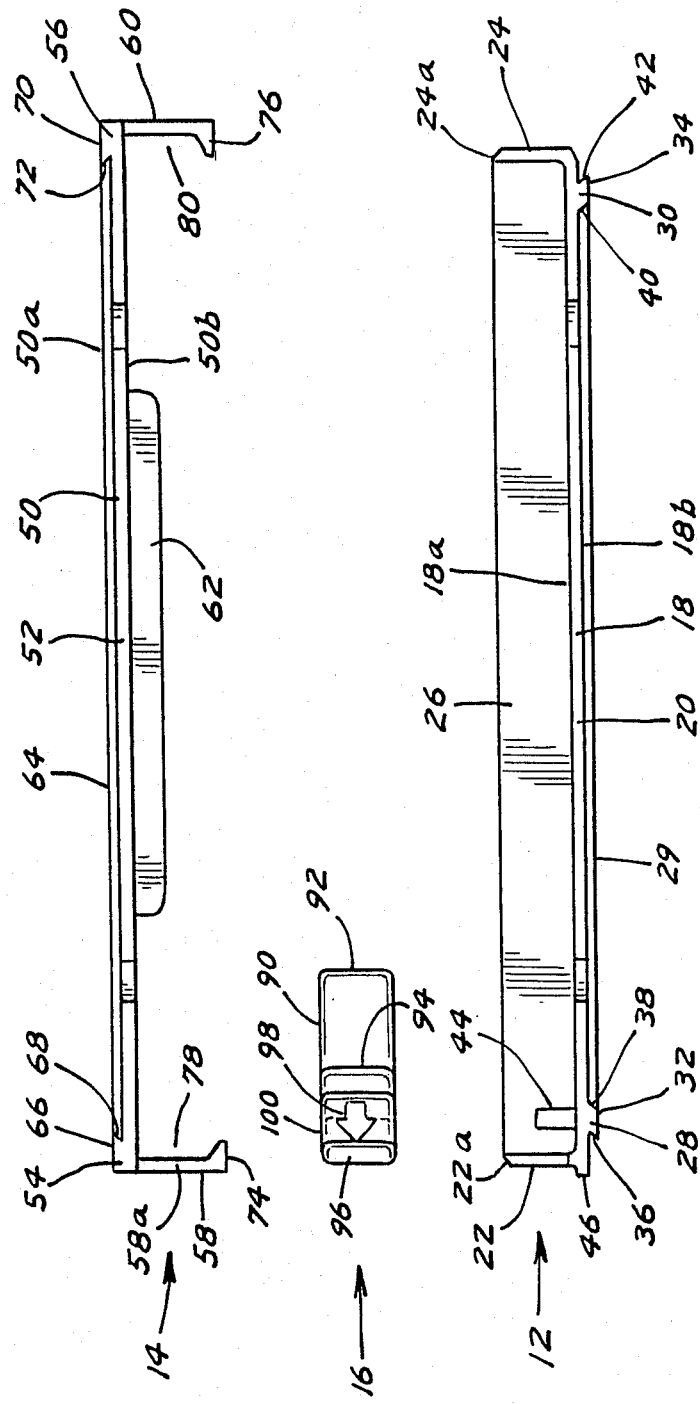
FIG. 5 illustrates an exploded end view of the data storage container.

FIG. 5 illustrates an exploded end view of the data storage container 10 prior to engagement of the package bottom and top members 12 and 14, and the mounting of retainer/ejector member 16.

MODE OF OPERATION

Figure 6:
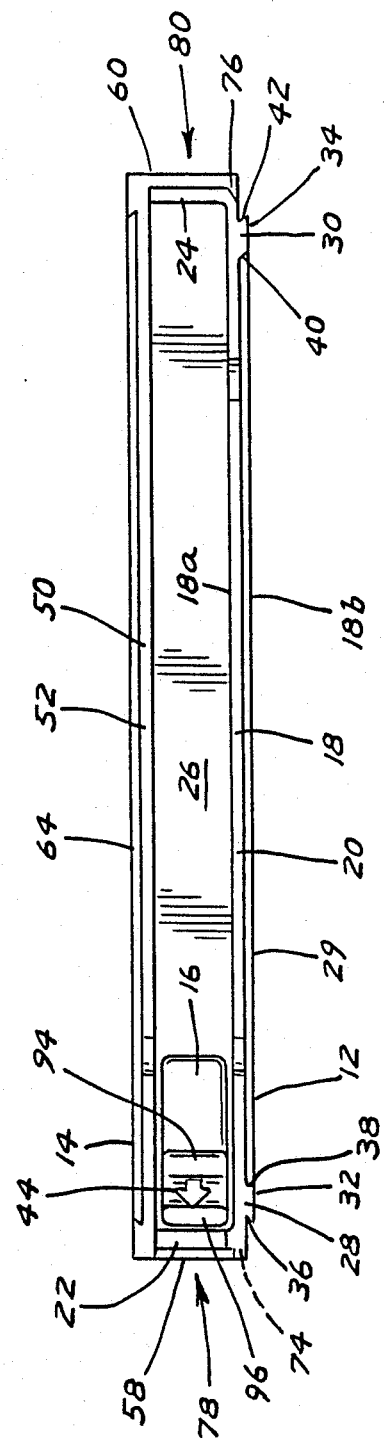
FIG. 6 illustrates an end view of a data storage container.
Figure 7:
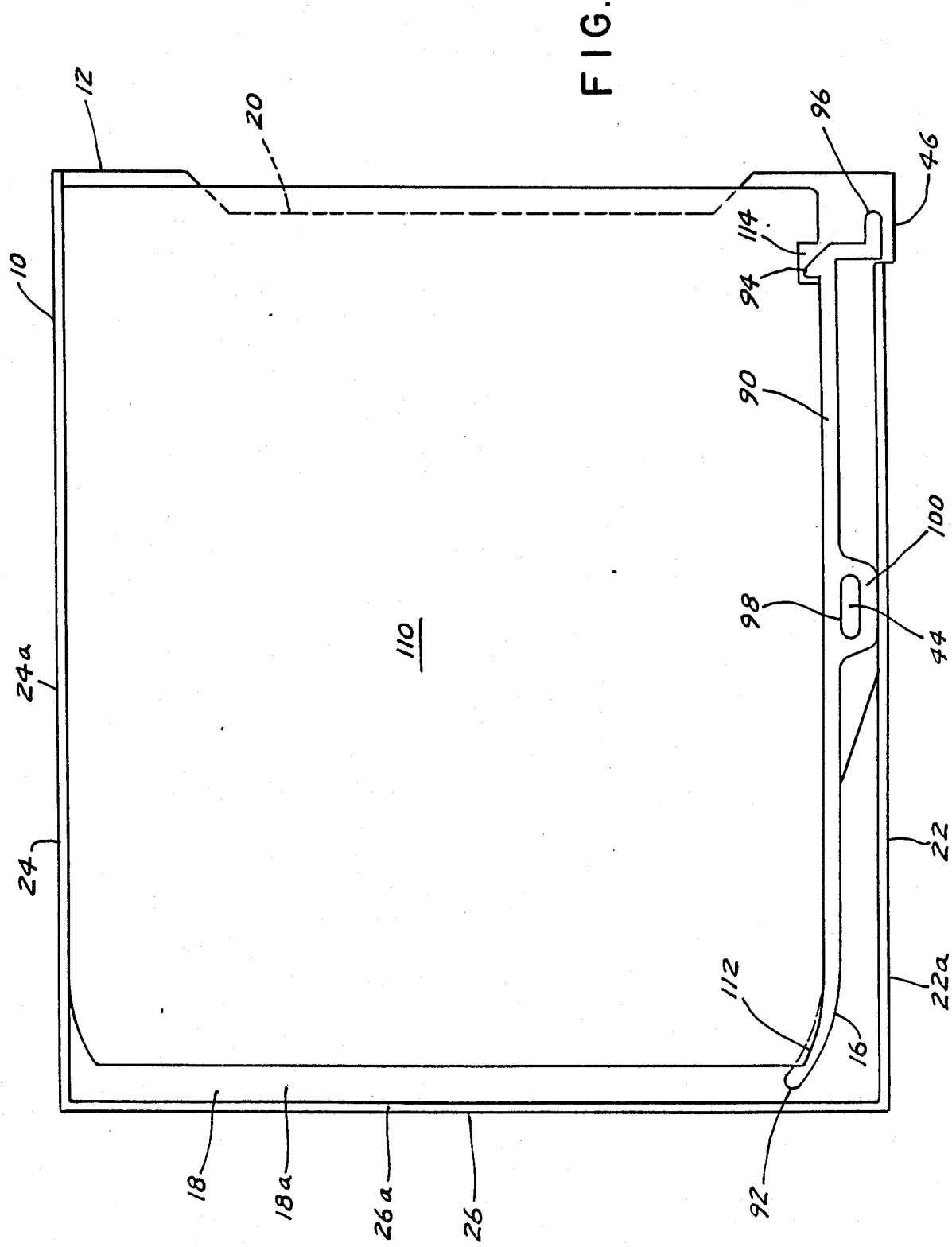
FIG. 7 illustrates a top view of a disk cartridge engaged in the data storage container bottom; and, FIG. 8 illustrates stacked data storage containers.
Figure 8:
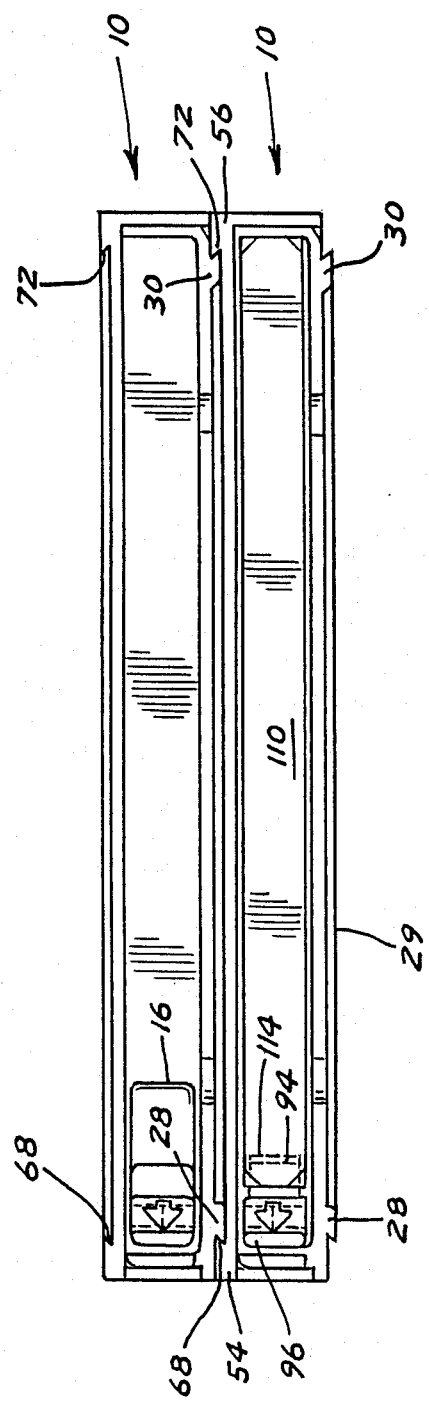

FIGS. 6, 7 and 8 illustrate the mode of operation of the data storage container as now described in detail.

FIG. 6 illustrates an end view of an assembled data storage container 10 where all numerals correspond to those elements previously described. Assembly is accomplished by sliding either lip 74 or 76 over a corresponding side wall 22 or 24, after which the opposite corresponding members are pressed together causing the opposite top side wall to flex over the opposite bottom side wall until engagement of the lip is achieved.

One alternative method of engagement is accomplished by aligning end 64 of the package top member 14 with the open end of the package bottom member 12, and then sliding top and bottom together with lips 74 and 76 over side walls 22 and 24 until the stop bar 62 engages end wall 26; and/or, until vertical end 58a engages against tab 46, thus ensuring secure retention of the package top member 14 to the package bottom member 12.

FIG. 7 illustrates a top view of a disk cartridge 110 held within data storage container 10 where all numerals correspond to those elements previously described. The package top member 14 has been removed for clarity of illustration. As the disk cartridge 110 is slid into the data storage container, the catch 94 is forced past the end of side wall 22, through the opening provided in the side wall 22 by the disk cartridge 110. The disk cartridge 110 is slid into the package until the catch 94 springs into notch 114 in the edge of the disk cartridge 110. To disengage the disk cartridge 110 from the data storage container 10, the catch release 96 is manually moved towards the side wall 22 to release the catch 94 from the notch 114 in the disk cartridge 110. The spring action of the annular end member 92 then ejects the disk cartridge 110 partially out of the data storage container past the access cutouts 20 and 52 so that the disk can be grasped and removed from the interior of the data storage container 10.

FIG. 8 illustrates like data storage containers 10 stacked one upon the other where all numerals correspond to those elements previously described. The bottom tapered parallel rails 28 and 30 of the upper data storage container 10 are frictionally engaged via sliding with rail members 54 and 56 of the lower data storage container 10. As the package top member 14 is slid onto the package bottom member 12, the tapered parallel rails 28 and 30 of the package top member 14 engage the angled surfaces 68 and 72 of the package bottom member 12. The force required for adequate frictional engagement is slightly increased as the package top member 14 slides homeward for a snug aligned fit on the package bottom member 12. Any appropriate number of data storage containers 10 may be engaged one in another and positioned in either a horizontal or vertical fashion as desired.

Various modifications can be made to the present invention without departing from the apparent scope thereof.

I claim:

1. An open-ended data storage container for storage of a disk cartridge comprising:
   a. package top having two flexible opposing sides, each including inwardly extending and tapering lip portions;
   b. package bottom having two opposing sides adapted to engage between the sides of said package top and tapered so as to be retained by said lip portions; and,
   c. flexible retainer means including ejector spring affixed to said package bottom and further including an annular deflectable end portion for engaging the back wall of an inserted disk cartridge, and a movable catch portion for engaging and retaining an inserted disk cartridge.

2. A data storage container according to claim 1 wherein said package top and package bottom have complementing rails for engagement with like packages, forming a data storage container.

3. A package for storing a data memory element comprising:
   a. a first portion having a generally planar surface;
   b. two rails fixedly coupled substantially perpendicular to said generally planar surface of said first portion;
   c. A lip fixedly coupled substantially perpendicular to each of said two rails whereby a channel formed paralleled to each of said two rails fixedly coupled to said first portion;
   d. a second portion having a generally planar surface;
   e. two rails fixedly coupled substantially perpendicular to said generally planar surface of said second portion adapted to be frictionally engaged within said channel formed parallel to each of said two rails fixedly coupled to said first portion; and,
   f. means for releasably retaining said first portion in fixed relation to said second portion.

4. A package for storing a data memory element according to claim 3 further comprising means responsively coupled to said first portion for releasably engaging said data memory element and for ejecting said data memory element upon manual release.

5. A package for storing a data memory element according to claim 3 wherein said lip is tapered for engaging.

* * * * *